United States Patent Office 3,160,638
Patented Dec. 8, 1964

3,160,638
5-PHOSPHOMETHYL DERIVATIVES OF 6-CHROM-
ANOLS AND PROCESSES FOR PREPARING SAME
Karl Folkers, Menlo Park, Calif., and Arthur F. Wagner,
Princeton, N.J., assignors to Merck & Co., Inc., Rahway, N.J., a corporation of New Jersey
No Drawing. Filed Mar. 19, 1963, Ser. No. 266,201
28 Claims. (Cl. 260—345.5)

This invention relates to substituted methyl derivatives of 1,4-quinones and their corresponding 6-chromanols. More particularly, it is concerned with 5-phosphomethyl derivatives of 6-chromanols and processes and intermediates for their synthesis from appropriately substituted 1,4-quinones.

Oxidative phosphorylation is an essential reaction in the respiratory sequence of most living tissue. In this process, energy is stored by the biosynthesis of ATP and released by the heterolytic cleavage of the active phosphate moiety of ATP. For the biosynthesis of ATP, low energy phosphate must be converted to high energy phosphate prior to its reaction with ADP to form ATP. The compounds of this invention appear to participate in metabolic processes involving hydrogen transport and coupled phosphorylation; in this process, low energy phosphate is converted oxidatively to a form of high energy phosphate. The phosphates of this invention on oxidation could yield active phosphate for these metabolic conversions.

It is an object of this invention to provide new 5-phosphomethyl derivatives of 6-chromanols and processes for their preparation. Another object is to provide new 5-halomethyl derivatives of 6-chromanols and processes for their preparation. A further object is to provide methods of converting 5-halomethyl derivatives to the corresponding 5-phosphomethyl derivatives of the chromanols. Still another object is to provide a method for the direct conversion of γ-hydroxy derivatives of 2,3-dimethoxy-5-methyl-6-alkyl-1,4-benzoquinones to the corresponding 5-phosphomethyl-6-chromanols. These and other objects of our invention will be apparent from the detailed description of this invention hereinafter provided.

In accordance with an embodiment of this invention, the γ-hydroxy side chain substituted derivatives (I) of the 1,4-quinones are reacted with an acyl halide to produce the corresponding 5-chloromethyl-6-chromanyl acylates (II). The latter compounds are then reacted with a silver phosphate ester such as silver dibenzyl phosphate to produce the corresponding 5-phosphomethyl triester derivatives (III). The phosphate derivatives are then selectively reduced to cleave two of the ester groups of the phosphate moiety and yield the 5-phosphomethyl-6-chromanyl acylates (IV) which may be further selectively hydrolyzed to produce the corresponding 5-phosphomethyl-6-chromanols (V). These reactions can be shown structurally as follows:

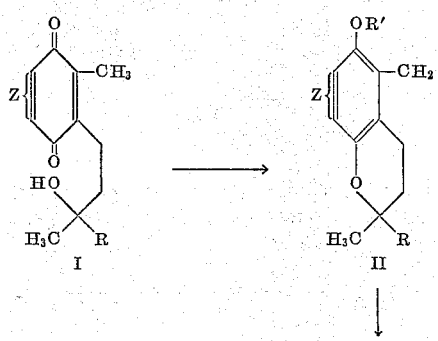

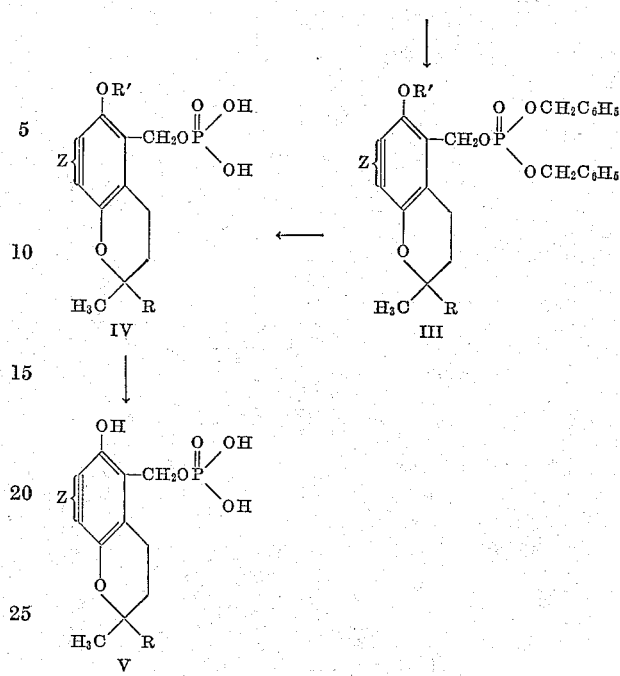

In the above flow sheet, Z represents

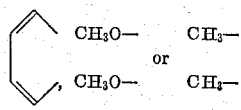

X represents halogen, R' represents an acyl radical and R represents methyl or $$CH_2(CH_2CH_2\overset{CH_3}{\underset{|}{C}}HCH_2)_nH$$

wherein $n$ represents an integer from one to nine. Thus, these reactions can be carried out with the γ-hydroxy side chain substituted derivative of vitamin $K_1$ of the formula

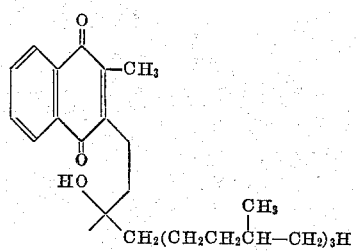

a compound of the coenzyme Q series having the formula

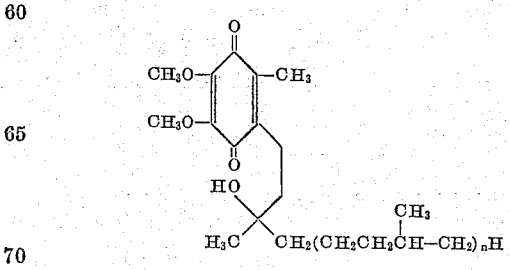

wherein n is an integer from zero to nine, or a vitamin E derivative of the formula

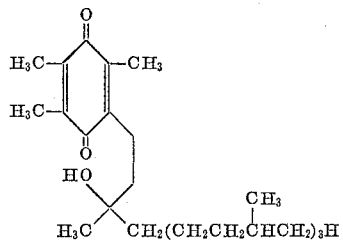

These γ-hydroxy side chain substituted derivatives of vitamin K₁ and the coenzyme Q series can be prepared in accordance with procedures described in copending application Serial No. 266,202 filed March 19, 1963.

The first step of this above-described procedure is carried out by mixing the γ-hydroxy derivative (I) with an acyl halide and allowing the reaction mixture to stand at room temperature for sufficient time to convert the γ-hydroxy compound to the desired 5-chloromethyl-6-acylate (II). While various acyl halides can be used for this reaction, it is preferred to utilize a lower alkanoyl chloride or bromide such as acetyl chloride, propionyl bromide, propionyl chloride and the like. After completion of the reaction, the desired reaction product is recovered by pouring the reaction mixture onto ice, extracting the aqueous solution with ether and evaporating the dried ether extract.

The second step of the process is effected by reacting the 5-halomethyl compound (II) with silver dibenzyl phosphate in a suitable solvent for the halomethyl compound such as benzene, toluene, acetonitrile and the like and refluxing the resulting reaction mixture for sufficient time to complete the formation of the desired triester. This product can be recovered by filtering the reaction mixture to remove the silver chloride, washing the filtered solution with water and concentrating the dried solvent under reduced pressure.

The benzyl groups of the triphosphate (III) so obtained can be cleaved by hydrogenolysis under mild conditions, for example, by reaction with hydrogen in the presence of a a hydrogenation catalyst such a noble metal in a suitable solvent medium such as ethanol, dioxane and the like. After completion of the reaction, the dihydrogenphosphate (IV) can be recovered by removing the catalyst and by evaporating the solvent. The dihydrogenphosphate (IV) so obtained is an acidic substance forming salts with alkalis and other basic substances. It is converted to the corresponding 5-phosphomethyl-6-chromanol (V) by selective hydrolysis.

Thus, in accordance with the above-described procedures, the γ-hydroxy side chain substituted derivative of vitamin K, of vitamin E, and of 2,3-dimethoxy-5-methyl-6-alkyl-1,4-benzoquinones such as 2,3-dimethoxy-6-(3-hydroxy-3-methylbutyl)-5-methyl-1,4-benzoquinone, 2,3-dimethoxy-6-(3-hydroxy-3,7,11,15 - tetramethylhexadecyl)-5-methyl-1,4-benzoquinone, 2,3-dimethoxy-6-(3-hydroxy-3,7,11,15,19,23,27,31,35,39 - decamethyltetracontyl) - 5-methyl-1,4-benzoquinone, and the like are converted to the corresponding 5-phosphomethyl-6-chromanol.

Alternatively, and in accordance with a further embodiment of this invention, the 5-phosphomethyl-6-chromanols of the 2,3-dimethoxy-5-methyl-6-alkyl-1,4-benzoquinones can also be obtained by reacting the corresponding γ-hydroxy substituted side chain derivative with phosphoric acid.

The following examples illustrate specific methods of carrying out the various processes of the present invention.

*Example 1*

5-chloromethyl-3,4-dihydro-2-methyl - 2 - (4,8,12 - trimethyltridecyl)-2-H-naphtho[1,2-b-]pyran-6-yl acetate.—Three grams of 3-(3-hydroxy-3,7,11,15-tetramethylhexadecyl)-2-methyl-1,4-naphthoquinone is reacted with 15 ml. of acetyl chloride. The reaction mixture is protected from atmospheric moisture and allowed to stand at room temperature overnight. The mixture was poured onto ice, and the product extracted with ether. The extract is washed with water, dried over anhydrous magnesium sulfate and concentrated, and the product purified by chromatography on 200 g. of silica gel packed in n-hexane. After impurities are eluted from the column with 1% ether in n-hexane, 5-chloromethyl-3,4-dihydro-2-methyl-2-(4,8,12-trimethyltridecyl)-2-H-naphtho[1,2-b]pyran - 6-yl acetate is eluted with 3% ether in n-hexane. The product was characterized by $\lambda_{max.}^{isooctane}$ 248 m$\mu$ (E% 707); $\lambda_{max.}^{neat}$ 3.4$\mu$; 5.65$\mu$ The 3-(3-hydroxy-3,7,11,15,-tetramethylhexadecyl) - 2-methyl-1,4-naphthoquinone used as the starting material can be prepared as follows:

An ice cold mixture of 2.2 g. of vitamin K₁(₂₀), (2-methyl-3-phytyl-1,4-naphthoquinone), in 20 ml. of concentrated sulfuric acid is stirred until it becomes homogenous. The solution is kept ice cold for about an hour and then poured onto ice. The product is extracted with ether, and the extract washed with water, dried over anhydrous magnesium sulfate and concentrated in vacuo. The residual oil (2.2 g.) is purified by chromatography on a column of 230 g. of silica gel packed in n-hexane. After preliminary elution using n-hexane and n-hexane containing 1%, 3% and 10% ether, the product is eluted with n-hexane containing 25% ether. The eluate is concentrated and the residue is purified by chromatography on 200 g. of silica gel and elution with n-hexane. From the eluate, 3-(3-hydroxy-3,7,11,15-tetramethylhexadecyl)-2-methyl-1,4-naphthoquinone is obtained. The product is characterized by $\lambda_{max.}^{isooctane}$ 325 m$\mu$ (E% 58), 273 m$\mu$ (E% 375), 264 m$\mu$ (E% 366), 249 m$\mu$ (E% 398), 244 m$\mu$ (E% 380); $\lambda_{max.}^{neat}$ 2.9$\mu$, 6.0$\mu$

*Example 2*

5 - chloromethyl - 7,8-dimethoxy-2,2-dimethyl-6-chromanyl acetate.—Two hundred milligrams of 2,3-dimethoxy - 6 - (3-hydroxy-3-methylbutyl)-5-methyl-1,4-benzoquinone is dissolved in 1 ml. of acetyl chloride and allowed to react in the absence of moisture for sixteen hours at room temperature. The reaction mixture is poured onto ice and extracted with ether; the extract being washed with water and dried over magnesium sulfate. The ether is evaporated at reduced pressure leaving a yellow oil which crystallizes on standing. Pure 5-chloromethyl - 7,8-dimethoxy-2,2-dimethyl-6-chromanyl acetate, M.P. 82–84° C., is obtained by recrystallization of the reaction product from cold methanol.

The 2,3 - dimethoxy - 6-(3-hydroxy-3-methylbutyl)-5-methyl-1,4-benzoquinone used as the starting material in the above example is prepared as follows:

Two hundred and fifty milligrams of the 6-chromanol of coenzyme Q₁ (7,8 - dimethoxy-2,2,5-trimethyl-6-chromanol), is dissolved in 30 ml. of ether, and a mixture of 10 ml. of 5% ferric chloride in ethanol and 10 ml. of water is added slowly with rapid stirring. The reaction mixture is diluted with water and the layers separated. The ether solution is washed with water until neutral, and then dried over magnesium sulfate. Evaporation of the ether yields 2,3 - dimethoxy-6-(3-hydroxy-3-methylbutyl) - 5-methyl-1,4-benzoquinone. It is characterized by $\lambda_{max.}$ of 275–280 m$\mu$.

*Example 3*

5 - chloromethyl-8,7-dimethoxy-2-methyl-2-(4,8,12-trimethyltridecyl)-6-chromanyl acetate.—A solution containing 206 mg. of 2,3-dimethoxy-6-(3-hydroxy-3,7,11, 15 - tetramethylhexadecyl)-5-methyl-1,4-benzoquinone in 10 ml. of acetyl chloride is allowed to stand at room temperature for 20 hrs. The solution is poured onto about 200 g. of crushed ice. Ether (100 ml.) is added, and the mixture stirred for 15 min. The aqueous layer is separated and extracted with 100 ml. of ether. The combined ether solutions are washed with water until the aqueous layer is almost neutral, and then dried over anhydrous magnesium sulfate. Evaporation of the ether under reduced pressure gives 5-chloromethyl-7,8-dimethoxy - 2 - methyl-2-(4,8,12-trimethyltridecyl)-6-chromanyl acetate, $$\lambda_{max.}^{isooctane}\ 292\ m\mu\ (E_{1\ cm.}^{1\%}\ 47.4)$$

An analytical sample is prepared by column chromatography. The produce is absorbed from an isooctane solution onto 25 g. of silica gel packed in isooctane. The column is washed with isooctane, and then eluted with ether-isooctane (5:95) giving of the pure compound:

$$\lambda_{max.}^{isooctane}\ 293\ m\mu\ (E_{1\ cm.}^{1\%}\ 48.2);\ \lambda_{max.}^{neat}\ 5.64\mu,\ 6.30\mu,\ 8.3\mu\ \text{and}\ 8.99\mu$$

The nuclear magnetic resonance spectrum is in accord with the structure.

The 2,3-dimethoxy-6-(3-hydroxy-3,7,11,15-tetramethylhexadecyl)-5-methyl-1,4-benzoquinone used as the starting material in this example can be prepared as follows:

To a solution containing 5 g. of the 6-chromanol of hexahydrocoenzyme Q$_4$[7,8 - dimethoxy-2,5-dimethyl-2-(4,8,12 - trimethyltridecyl)-6-chromanol] in 185 ml. of ether is added 185 ml. of 1.0 M ferric chloride in methanol-water (1:1). The two phase system is stirred at room temperature, 25° C., for 30 min., and then 300 ml. each of petroleum ether and water are added. The ether layer is washed with water, diluted with benzene, and separated from residual water. Evaporation under reduced pressure gives 2,3-dimethoxy-6-(3-hydroxy-3,7,11,15-tetramethylhexadecyl)-5-methyl-1,4-benzoquinone, $$\lambda_{max.}^{isooctane}\ 276\ m\mu\ (E_{1\ cm.}^{1\%}\ 322)$$

An analytical sample is prepared by column chromatography. One gram of the product is absorbed from an isooctane solution onto 100 g. of Florisil packed in isooctane. The column is washed with ethanol-isooctane (1:99), and then the product is eluted with ethanol-isooctane (3:97) giving 2,3-dimethoxy-6-(3-hydroxy-3,7,11,15-tetramethyldexadecyl)-5-methyl-1,4-benzoquinone, $$\lambda_{max.}^{isooctane}\ 276\ m\mu.\ (E_{1\ cm.}^{1\%}\ 325);\ \lambda_{max.}^{neat}\ 280\mu,\ 6.06\mu,\ 6.21\mu,\ 7.90\mu,\ 8.30\mu,\ \text{and}\ 8.63\mu$$

The nuclear magnetic resonance spectrum is consistant with the structure.

Example 4

O,O - dibenzyl - O-{6-acetoxy-3,4-dihydro-2-methyl-2-(4,8,12 - trimethyltridecyl) - 2-H-naphtho[1,2-b]pyran-5-ylmethyl} phosphate.—A mixture of 780 mg. of 5-chloromethyl - 3,4-dihydro-2-methyl-2-(4,8,12-trimethyltridecyl)-2-H-naphtho[1,2-b]pyran-6-yl acetate, 780 mg. of silver dibenzyl phosphate and 40 ml. of acetonitrile is refluxed for 2.5 hours. The mixture is cooled and filtered, and the filtrate concentrated. The residue is dissolved in ether, and the solution filtered and concentrated to yield 900 mg. of residual oil which is further purified by chromatography on silica packed in n-hexane. Impurities are eluted using n-hexane-ether mixtures. The product is selectively eluted with 50% ether in n-hexane to yield O,O - dibenzyl - O - {6-acetoxy-3,4-dihydro-2-methyl-2-(4,8,12 - trimethyltridecyl) - 2 - H-naphthol[1,2-b] pyran-5-ylmethyl} phosphate, $$\lambda_{max.}^{EtOH}\ 247\ m\mu\ (E\%\ 497),\ 215\ m\mu\ (E\%\ 653);\ \lambda_{max.}^{neat}\ 5.65\mu;\ 9.5-10.5\mu;\ 14.4\mu$$

Example 5

O,O - dibenzyl - O - (6-acetoxy-7,8-dimethoxy-2,2-dimethylchroman-5-ylmethyl)phosphate.—An 81-mg. portion of 5 - chloromethyl - 7,8-dimethoxy-2,2-dimethyl-6-chromanyl acetate is dissolved in 5 ml. of toluene and added to a suspension of 99 mg. of silver dibenzyl phosphate in approximately 15 ml. of dry toluene.

The mixture is refluxed under nitrogen for approximately 17 hours. The reaction mixture is cooled, and then filtered to remove precipitated silver chloride. The filtrate is washed with water, dried over sodium sulfate and concentrated in vacuo. The residual oil is taken up in chloroform and the solution concentrated to remove traces of toluene, yielding a 121-mg. residue. The infrared spectrum of the product shows the expected bands at 3.35, 5.6, 6.7, 6.85, 7.0, 7.3, 8.25, 8.9, 9.6, and 9.8μ. The ultraviolet spectrum in 95% ethanol shows $$\lambda_{max.}\ 286\ m\mu\ (E_{1\ cm.}^{1\%}\ 54)\ (\lambda_{min.}\ 261\ m\mu$$

shoulders at 258, 266, 270 mμ).

Example 6

O,O-dibenzyl-O-{6-acetoxy - 7,8 - dimethoxy-2-methyl-2-(4,8,12-trimethyltridecyl)chroman - 5 - ylmethyl} phosphate.—A 10-ml. portion of benzene is distilled from a suspension of 540 mg. of powdered silver dibenzyl phosphate in 40 ml. of dry benzene. A solution containing 540 mg. of 5-chloromethyl-7,8-dimethoxy-2-methyl-2-(4, 8,12-trimethyltridecyl)-6-chromanyl acetate in 5 ml. of dry benzene is added, and the mixture stirred and refluxed for 20 hrs. After being cooled, the mixture is diluted with an equal volume of hexane, and the insolubles removed by filtration. The filtrate is evaporated under reduced pressure giving O,O-dibenzyl-O-{6-acetoxy-7,8-dimethoxy - 2 - methyl-2-(4,8,12 - trimethyltridecyl) chroman-5-ylmethyl}phosphate $$\lambda_{max.}^{isooctane}\ 290\ m\mu\ (E_{1\ cm.}^{1\%}\ 34);\ \lambda_{max.}^{neat}\ 5.64\mu,\ 6.30\mu,\ 8.30\mu,\ 8.99\mu,\ 9.9-10.1\mu,\ \text{and}\ 14.35\mu$$

Example 7

6-acetoxy-3,4-dihydro - 2 - methyl-2-(4,8,12-trimethyltridecyl) - 2-H-naphtho[1,2-b]pyran-5-ylmethyl dihydrogenphosphate.—Hydrogen is bubbled through a solution of 450 mg. of O,O-dibenzyl-O{6-acetoxy-3,4-dihydro-2-methyl-2-(4,8,12 - trimethyltridecyl)-2-H-naphtho[1,2-b] pyran-5-ylmethyl} phosphate in 75 ml. of ethanol in the presence of 300 mg. of 5% Pd on carbon for about 3 hours. The reaction mixture is filtered and the filtrate concentrated in vacuo. The residue is dissolved in ether and the solution extracted with aqueous 5% potassium bicarbonate. The product is isolated from the alkaline extract by acidification, followed by ether extraction. The ether solution is dried over anhydrous sodium sulfate, filtered and concentrated; the residue is dissolved in a small volume of petroleum ether. The product precipitated slowly, and after several days, 6-acetoxy-3,4-dihydro-2-methyl-2-(4,8,12 - trimethyltridecyl)-2-H-naphtho[1,2-b]pyran-5-ylmethyl dihydrogenphosphate is collected by centrifugation. The amorphous product is characterized by $$\lambda_{max.}^{isooctane}\ 247\ m\mu\ (E_{1\ cm.}^{1\%}\ 506);\ \lambda_{max.}^{CCl_4}\ 2.9-4.0\mu;\ 5.65\mu,\ 8.3-9.1\mu,\ 9.5-10.1\mu$$

Example 8

O,O-dimethyl-O-{6-acetoxy - 3,4 - dihydro-2-methyl-2-(4,8,12-trimethyltridecyl) - 2 - H - naphtho[1,2-b]pyran-5-ylmethyl} phosphate.—Twenty-six milligrams of 6-acetoxy-3,4-dihydro-2-methyl - 2 - (4,8,12-trimethyltridecyl)-2-H-naphtho[1,2-b]pyran - 5 - ylmethyl dihydrogenphosphate is dissolved in a few ml. of ether and a solution of freshly prepared diazomethane in ether is added dropwise until an excess of the reagent is present. The excess diazomethane is destroyed with a few drops of acetic acid, and the ether solution is washed once with very dilute potassium bicarbonate solution, and twice with water. The ether solution is dried over anhydrous magnesium sulfate, filtered and concentrated in vacuo to yield O,O-dimethyl-O-{6-acetoxy-3,4-dihydro - 2 - methyl-2-(4,8,12-trimethyltridecyl) - 2 - H-naphtho[1,2-b]pyran-5-ylmethyl} dihydrogenphosphate as a colorless oil. The nuclear magnetic resonance spectrum of the product is in accord with the structure.

Example 9

6-acetoxy-7,8-dimethoxy - 2,2 - dimethylchroman-5-yl-methyl dihydrogenphosphate.—A 120-mg. portion of O, O-dibenzyl-O-(6 - acetoxy - 7,8 - dimethoxy-2,2-dimethylchroman-5-ylmethyl) phosphate is dissolved in 10 ml. of pure dioxane and shaken under a hydrogen atmosphere at room temperature with 100 mg. of 10% palladium on carbon catalyst in 10 ml. of dioxane which had been pre-equilibrated with hydrogen. After about ten minutes the consumption of hydrogen becomes slow, and the reaction is stopped after 15 minutes. The mixture is filtered, and the filtrate concentrated under vacuum to approximately 1-ml. volume. The product is then approximately neutralized with about one equivalent of 1 N potassium hydroxide. The resulting solution is concentrated to dryness under vacuum leaving a slightly yellow oily residue of the monopotassium salt of 6-acetoxy-7,8-dimethoxy-2,2-dimethylchroman - 5 - ylmethyl dihydrogenphosphate. The ultraviolet spectrum in 95% ethanol shows $\lambda_{max}$. 282 m$\mu$., ($E_{1\,cm.}^{1\%}$ 100)

($\lambda_{min}$. 254.5 m$\mu$). The infrared spectrum in chloroform shows strong bands at 3.4, 5.7, 6.9, 7.3, 8.6, and 8.9$\mu$.

The monopotassium salt is dissolved in water and one equivalent of hydrochloric acid added. The solution is then extracted with ether and the ether extracts evaporated to obtain 6-acetoxy-7,8-dimethoxy-2,2-dimethylchroman-5-ylmethyl dihydrogenphosphate.

Example 10

6-acetoxy-7,8-dimethoxy - 2 - methyl-2-(4,8,12-trimethyltridecyl)chroman - 5-ylmethyl dihydrogenphosphate.— Five hundred milligrams of O,O-dibenzyl-O-{6-acetoxy-7,8-dimethoxy-2-methyl - 2 - (4,8,12 - trimethyltridecyl) chroman-5-ylmethyl}phosphate is dissolved in 50 ml. of ethanol and hydrogenated at atmospheric pressure using 500 mg. of 5% palladium on charcoal. The theoretical amount of hydrogen is consumer in 10 min. The catalyst is removed by filtration, and the filtrate evaporated under reduced pressure. The residue is dissolved in 50 ml. of 0.5 N potassium bicarbonate, and the aqueous solution extracted with hexane, acidified with 15 ml. of 2 N hydrochloric acid, and extracted with ether. The ether solution is diluted with benzene, separated from residual water and evaporated under reduced pressure to yield 6-acetoxy-7,8-dimethoxy-2-methyl-2-(4,8,12-trimethyltridecyl)chroman-5-ylmethyl dihydrogenphosphate:

$\lambda_{max}^{isooctane}$ 289 m$\mu$ ($E_{1\,cm.}^{1\%}$ 43); $\lambda_{max.}^{neat}$ 4.1–4.5$\mu$, 5.65$\mu$, 6.30$\mu$, 8.30$\mu$, 8.99$\mu$, and 9.8$\mu$ The structure of the product is confirmed by nuclear magnetic analysis of the dimethylphosphate ester derivative prepared by treatment of the product with diazomethane.

Example 11

O,O-dimethyl-O-{6-acetoxy - 7,8 - dimethoxy-2-methyl-2-(4,8,12 - trimethyltridecyl)chroman - 5-ylmethyl} phosphate.—To a solution containing 32 mg. of 6-acetoxy-7,8-dimethoxy-2 - methyl - 2-(4,8,12 - trimethyltridecyl)chroman-5-ylmethyl dihydrogenphosphate in 10 ml. of ether is added 5 ml. of an ether solution containing a large excess of freshly prepared diazomethane. After 30 min., the solution is concentrated under reduced pressure giving O,O-dimethyl - O-{6-acetoxy-7,8 - dimethoxy-2 - methyl-2-(4,8,12-trimethyltridecyl)chroman - 5 - ylmethyl} phosphate:

$\lambda_{max}^{isooctane}$ 290 m$\mu$; $\lambda_{max.}^{neat}$ 5.65$\mu$, 8.30$\mu$, 8.90$\mu$, 8.97$\mu$, 9.58$\mu$, 9.85$\mu$, and 10.01$\mu$ The structure of the triester is confirmed by nuclear magnetic spectroscopy.

Example 12

5-acetoxymethyl-3,4 - dihydro-2-methyl - 2 - (4,8,12-trimethyltridecyl)-2-H-naphtho[1,2-b]pyran-6-yl acetate.— A mixture of 100 mg. of 5-chloromethyl-3,4-dihydro-2-methyl - 2-(4,8,12 - trimethyltridecyl) - 2-H - naphtho[1, 2-b]pyran-6-yl acetate, 100 mg. of silver acetate and 5 ml. of acetic acid is refluxed for 30 minutes. The reaction mixture is poured onto ice, and the product isolated by extraction with ether. The ether extract is dried over anhydrous magnesium sulfate and concentrated. The residue is purified by preparative thin-layer chromatography on silica using isooctane-benzene-acetone (85:13:2) to yield 5-acetoxymethyl-3,4-dihydro-2-methyl-2-(4,8,12-trimethyltridecyl)-2-H-naphtho[1,2-b]pyran-6-yl acetate, $R_f$ 0.88–0.1:

$\lambda_{max.}^{isooctane}$ 247 m$\mu$ ($E_{1\,cm.}^{1\%}$ 556); $\lambda_{max.}^{neat}$ 5.6$\mu$, 5.75$\mu$

Example 13

7,8-dimethoxy - 6-hydroxy - 2-methyl - 2-(4,8,12 - trimethyltridecyl)-chroman - 5 - ylmethyl dihydrogenphosphate.—Two hundred milligrams of 2,3-dimethoxy-6-(3-hydroxy-3,7,11,15 - tetramethylhexadecyl)-5 - methyl-1,4-benzoquinone is stirred with 4.65 g. of phosphoric acid prepared by mixing 3.4 g. of 85% phosphoric acid and 1.25 g. of phosphorus pentoxide. The reaction mixture immediately becomes a homogeneous purple mass. After 10 minutes, the purple color fades to a greenish black, and two phases start to separate. At the end of one hour, the reaction mixture is extracted with petroleum ether. Complete separation of the two phases is achieved by centrifugation. The petroleum ether extract is added directly to a column of silica gel in petroleum ether, and the product is eluted with petroleum ether. The eluate is extracted with several portions of water until the aqueous wash is neutral. The organic phase is then dried over anhydrous sodium sulfate and concentrated under reduced pressure; 7,8-dimethoxy-6-hydroxy-2-methyl-2-(4,8,12 - trimethyltridecyl)-chroman - 5-ylmethyl dihydrogenphosphate is obtained in this manner.

The new 5-phosphomethyl compounds of this invention in addition to being useful in the study of metabolic processes involving hydrogen transport and phosphorylation are also useful as antioxidants and as sun screening agents. Thus, the compounds can be used in the preservation of chicken sperm. They may also be used as antioxidants for oils and fats. In addition, since the phosphates absorb ultraviolet light rays, they could be used in the preparation of anti-sunburn preparations. These phosphorylated derivatives are superior to the non-phosphorylated analogs because salts of the phosphates can be prepared which permit improved dispersion in aqueous vehicles. At the same time these phosphates in the free form as well as certain salts also have certain solubility in organic solvents because of their lipid characteristics.

Various changes and modifications of the invention can be made, and to the extent that such variations incorporate the spirit of this invention, they are intended to be included within the scope of the appended claims.

What is claimed is:

1. The process which comprises reacting a $\gamma$-hydroxy derivative of a 1,4-quinone of the formula

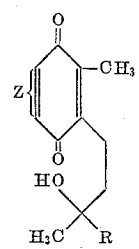

wherein Z is a member from the group consisting of

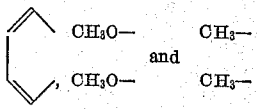

and R is a member from the group consisting of methyl and

wherein *n* is an integer from one to nine, with a halide from the group consisting of lower alkanoyl chlorides and bromides to produce a compound of the formula

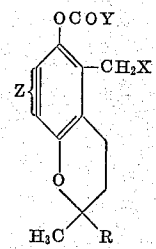

wherein Z and R are defined as above, Y is lower alkyl, and X is a halogen from the group consisting of chlorine and bromine.

2. The process which comprises reacting 3-(3-hydroxy-3,7,11,15 - tetramethylhexadecyl) - 2 - methyl - 1,4 - naphthoquinone with acetyl chloride to produce 5-chloromethyl - 3,4 - dihydro - 2 - methyl - 2 - (4,8,12 - trimethyltridecyl)-2-H-naphtho[1,2-b]pyran-6-yl acetate.

3. The process which comprises reacting 2,3-dimethoxy - 6 - (3 - hydroxy - 3 - methylbutyl) - 5 - methyl - 1,4-benzoquinone with acetyl chloride to produce 5-chloromethyl-7,8-dimethoxy-2,2-dimethyl-6-chromanyl acetate.

4. The process which comprises reacting 2,3-dimethoxy - 6 - (3 - hydroxy - 3,7,11,15 - tetramethylhexadecyl)-5-methyl-1,4-benzoquinone with acetyl chloride to produce 5 - chloromethyl - 7,8 - dimethoxy - 2 - methyl - 2 - (4,8,12-trimethyltridecyl)-6-chromanyl acetate.

5. A compound of the formula

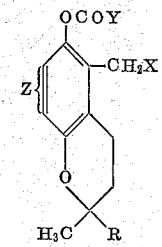

wherein Z is a member from the group consisting of

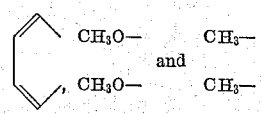

Y is lower alkyl, R is a member from the group consisting of methyl and

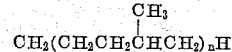

wherein *n* is an integer from one to nine, and X is a halogen from the group consisting of chlorine and bromine.

6. 5 - chloromethyl - 3,4 - dihydro - 2 - methyl - 2 - (4,8,12-trimethyltridecyl) - 2 - H - naphtho[1,2-b]pyran-6-yl acetate.

7. 5 - chloromethyl - 7,8 - dimethoxy - 2,2 - dimethyl-6-chromanyl acetate.

8. 5 - chloromethyl - 7,8 - dimethoxy - 2 - methyl - 2-(4,8,12-trimethyltridecyl)-6-chromanyl acetate.

9. The process which comprises reacting a γ-hydroxy derivative of a 1,4-quinone of the formula

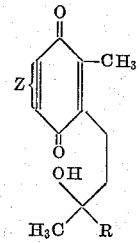

wherein Z is a member from the group consisting of

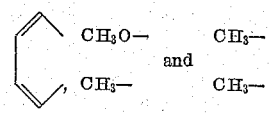

and R is a member from the group consisting of methyl and

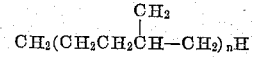

wherein *n* is an integer from one to nine, with a halide from the group consisting of lower alkanoyl chlorides and bromides, and intimately contacting the resulting reaction product with silver dibenzyl phosphate to produce a compound of the formula

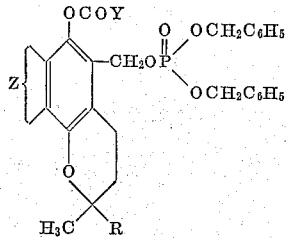

wherein Z and R are the same as above and Y is lower alkyl.

10. The process which comprises reacting 3 - (3 - hydroxy - 3,7,11,15 - tetramethylhexadecyl) - 2 - methyl-1,4-naphthoquinone with acetyl chloride to produce 5-chloromethyl - 3,4 - dihydro - 2 - methyl - 2 - (4,8,12 - trimethyltridecyl) - 2 - H - naphtho[1,2-b]pyran - 6 - yl acetate, and intimately contacting this product with silver dibenzyl phosphate to produce O,O-dibenzyl-O-{6-acetoxy - 3,4 - dihydro - 2 - methyl - 2 - (4,8,12 - trimethyltridecyl)-2-H-naphtho[1,2-b]pyran - 5 - ylmethyl} phosphate.

11. The process which comprises reacting 2,3-dimethoxy - 6 - (3 - hydroxy - 3 - methylbutyl) - 5 - methyl - 1,4-benzoquinone with acetyl chloride to produce 5-chloromethyl - 7,8 - dimethoxy - 2,2 - dimethyl - 6 - chromanyl acetate, and intimately contacting this product with silver dibenzyl phosphate to produce O,O-dibenzyl-O-(6-acetoxy - 7,8 - dimethoxy-2,2-dimethylchroman - 5 - ylmethyl phosphate.

12. The process which comprises reacting 2,3-dimethoxy - 6 - (3 - hydroxy - 3,7,11,15 - tetramethylhexadecyl)-5-methyl-1,4-benzoquinone with acetyl chloride to produce 5 - chloromethyl - 7,8 - dimethoxy - 2 - methyl - 2-(4,8,12-trimethyltridecyl)-6-chromanyl acetate, and intimately contacting this product with silver dibenzyl phosphate to produce O,O-dibenzyl-O-{6-acetoxy-7,8-dimethoxy - 2 - methyl - 2 - (4,8,12 - trimethyltridecyl)chroman-5-ylmethyl} phosphate.

13. The process which comprises intimately contacting a compound of the formula

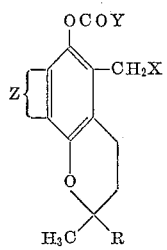

wherein Z is a member from the group consisting of

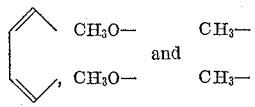

Y is lower alkyl, X is a halogen from the group consisting of chlorine and bromine and R is a member from the group consisting of methyl and

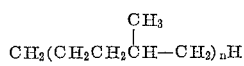

wherein $n$ is an integer from one to nine with silver dibenzyl phosphate to produce a compound of the formula

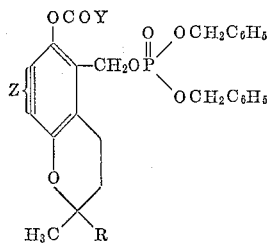

wherein Z, Y and R are the same as above.

14. A compound of the formula

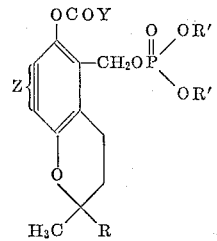

wherein Z is a member from the group consisting of

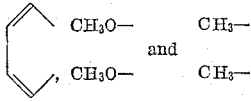

Y is lower alkyl, R' is a member from the group consisting of benzyl and lower alkyl and R is a member from the group consisting of methyl and

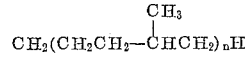

wherein $n$ is an integer from 1 to 9.

15. O,O - dibenzyl-O-{6-acetoxy-3,4-dihydro-2-methyl-2 - (4,8,12 - trimethyltridecyl)-2-H-naphtho[1,2-b]pyran-5-ylmethyl} phosphate.

16. O,O - dibenzyl-O-{6-acetoxy-7,8-dimethoxy-2,2-dimethylchroman-5-ylmethyl} phosphate.

17. O,O - dibenzyl-O-{6-acetoxy-7,8-dimethoxy-2-methyl-2-(4,8,12-trimethyltridecyl)chroman-5-ylmethyl} phosphate.

18. O,O - dimethyl-O-{6-acetoxy-3,4-dihydro-2-methyl-2 - (4,8,12 - trimethyltridecyl)-2-H-naphtho[1,2-b]pyran-5-ylmethyl} phosphate.

19. The process which comprises reacting a compound of the formula

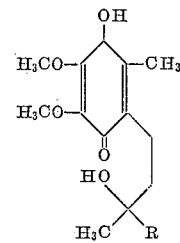

wherein R is a member from the group consisting of methyl and

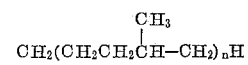

wherein $n$ is an integer from one to nine with phosphoric acid to produce a compound of the formula

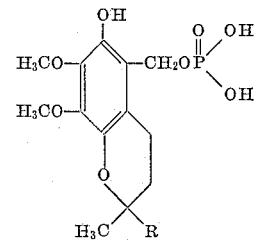

wherein R is the same as above.

20. A process which comprises reacting 2,3-dimethoxy-6 - (3-hydroxy-3,7,11,15-tetramethylhexadecyl)-5-methyl-1,4-benzoquinone with phosphoric acid to produce 7,8-dimethoxy - 6 - hydroxy-2-methyl-2-(4,8,12-trimethyltridecyl)-chroman-5-ylmethyl dihydrogenphosphate.

21. The process which comprises reacting a compound of the formula

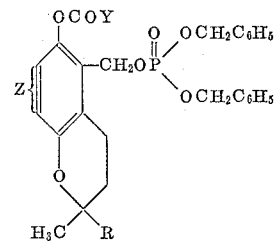

wherein Z is a member from the group consisting of

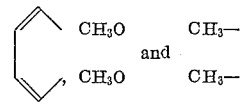

Y is lower alkyl, and R is a member from the group consisting of methyl and

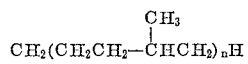

where $n$ is an integer from one to nine with hydrogen in the presence of a noble metal catalyst to produce the corresponding dihydrogenphosphate compound.

22. A compound from the group consisting of compounds having the formula

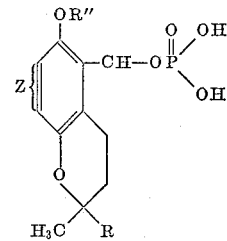

wherein Z is a member from the group consisting of

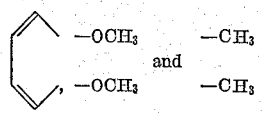

and

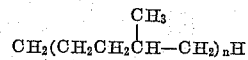

R″ is a member from the group consisting of hydrogen and lower alkanoyl, and R is a member from the group consisting of methyl and $$CH_2(CH_2CH_2\overset{CH_3}{\underset{|}{C}H}-CH_2)_nH$$

wherein $n$ is an integer from one to nine, and salt thereof.

23. 6 - acetoxy - 3,4 - dihydro - 2 - methyl-2-(4,8,12-trimethyltridecyl) - 2H-naphtho[1,2-b]pyran-5-ylmethyl dihydrogenphosphate.

24. 6 - acetoxy - 7,8 - dimethoxy-2,2-dimethylchroman-5-ylmethyl dihydrogenphosphate.

25. 6 - acetoxy - 7,8-dimethoxy-2-methyl-2-(4,8,12-trimethyltridecyl)chroman-5-ylmethyl dihydrogenphosphate.

26. 6 - hydroxy - 3,4 - dihydro - 2-methyl-2-(4,8,12-trimethyltridecyl) - 2H-naphtho-[1,2-b]pyran-5-ylmethyl dihydrogenphosphate.

27. 6 - hydroxy - 7,8-dimethoxy-2,2-dimethylchroman-5-ylmethyl dihydrogenphosphate.

28. 6 - hydroxy - 7,8-dimethoxy-2-methyl-2-(4,8,12-trimethyltridecyl)chroman-5-ylmethyl dihydrogenphosphate.

References Cited in the file of this patent

UNITED STATES PATENTS

| 2,486,542 | Weisler et al. | Nov. 1, 1949 |
| 3,026,330 | Folkers et al. | Mar. 20, 1962 |

FOREIGN PATENTS

| 826,640 | Great Britain | Jan. 13, 1960 |

OTHER REFERENCES

Royals, Advanced Organic Chemistry, pp. 271, 604–607, Prentice-Hall, Inc., Englewood Cliffs, N.J. (1956).